US011570271B2

(12) United States Patent
Bahl et al.

(10) Patent No.: US 11,570,271 B2
(45) Date of Patent: Jan. 31, 2023

(54) DIFFERENTIATED SMART SIDECARS IN A SERVICE MESH

(71) Applicant: Cisco Technology, Inc., San Jose, CA (US)

(72) Inventors: Rohit Bahl, Kanata (CA); Ramesh Yeevani-Srinivas, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 16/380,872

(22) Filed: Apr. 10, 2019

(65) Prior Publication Data

US 2020/0329114 A1    Oct. 15, 2020

(51) Int. Cl.
*H04L 67/567* (2022.01)
*G06N 20/00* (2019.01)
*H04L 67/10* (2022.01)

(52) U.S. Cl.
CPC .......... *H04L 67/567* (2022.05); *G06N 20/00* (2019.01); *H04L 67/10* (2013.01)

(58) Field of Classification Search
CPC ...... G06N 20/00; H04L 67/10; H04L 67/2838
See application file for complete search history.

(56) References Cited

U.S. PATENT DOCUMENTS

| 9,519,520 | B2 | 12/2016 | Krueger | |
|---|---|---|---|---|
| 10,684,940 | B1 * | 6/2020 | Kayal | G06F 11/368 |
| 2009/0099985 | A1 * | 4/2009 | Tesauro | G06N 5/02 |
| | | | | 706/12 |
| 2017/0317932 | A1 * | 11/2017 | Paramasivam | H04L 67/02 |
| 2017/0364831 | A1 * | 12/2017 | Ghosh | G06F 11/30 |
| 2018/0034903 | A1 * | 2/2018 | Ananthapadmanabh | H04L 67/1008 |
| 2018/0069806 | A1 * | 3/2018 | Kumar | H04L 47/826 |
| 2018/0121221 | A1 * | 5/2018 | Ahuja | H04L 63/02 |
| 2018/0239647 | A1 | 8/2018 | Tsai et al. | |
| 2018/0331905 | A1 | 11/2018 | Toledo et al. | |
| 2019/0097912 | A1 * | 3/2019 | Salam | G06N 3/049 |
| 2019/0325353 | A1 * | 10/2019 | Aftab | G06N 20/00 |
| 2020/0120000 | A1 * | 4/2020 | Parthasarathy | H04L 67/1097 |

(Continued)

OTHER PUBLICATIONS

Palm, Jonas, "Service Isolation in Large Microservice Networks", http://www.nada.kth.se (Jun. 11, 2018) pp. 01-47.

(Continued)

*Primary Examiner* — William G Trost, IV
*Assistant Examiner* — Christopher P Cadorna
(74) *Attorney, Agent, or Firm* — Merchant & Gould P.C.

(57) ABSTRACT

Differentiated sidecars in a service mesh may be provided. A first routing rule includes a first plurality of weights to be associated with a first plurality of data paths of a first microservice instance may be received. Next, first mapping between a first set of features associated with the first microservice instance and the first plurality of weights may be determined. Then a second microservice instance may be detected and a second set of features associated with the second microservice instance may be detected. A second routing rule comprising a second plurality of weights to be associated with a second plurality of data paths of the second microservice instance may be determined. The second plurality of weights may be determined such that a second mapping between the second set of features and the second plurality of weights imitates the first mapping.

20 Claims, 7 Drawing Sheets

(56) References Cited

U.S. PATENT DOCUMENTS

| | | | | |
|---|---|---|---|---|
| 2020/0162380 A1* | 5/2020 | Pilkington | .............. | H04L 45/70 |
| 2020/0220848 A1* | 7/2020 | Patwardhan | ............ | H04L 45/64 |
| 2020/0242237 A1* | 7/2020 | Simpson | ............ | H04L 63/1425 |
| 2020/0247611 A1* | 8/2020 | Sharp | ..................... | G06Q 50/28 |
| 2020/0296172 A1* | 9/2020 | Gunjal | ................... | H04L 45/42 |
| 2020/0359296 A1* | 11/2020 | Dugaev | ................ | H04W 40/12 |

OTHER PUBLICATIONS

Carosi, Robert, "Protractor: Leveraging Distributed Tracing in Service Meshes for Application Profiling at Scale" KTH Royal Institute of Technology (Jun. 29, 2018) pp. 01-82.

Shenoy,Roopa M. and Singuru, Radhakrishna, "Service mesh for microservices managment, PES scalable platform and software products" Wipro Limited, IND/B7T (Jan. 2019) 7 pages.

* cited by examiner

DIFFERENTIATED SMART SIDECARS IN A SERVICE MESH

TECHNICAL FIELD

The present disclosure relates generally to microservice architecture.

BACKGROUND

Microservice architecture is becoming increasingly popular in application development. In microservice architecture, an application may be broken down into independently deployable, small, modular services in which each service may run a unique process and communicates through a well-defined, light weight mechanism to serve a business purpose. These independently deployable modular services may be referred to as microservices. Each microservice instance may be encapsulated in a software package referred to as a container. The container may provide the necessary environment including code, runtime, system tools, system libraries, etc. for the microservice instance to run. In a containerized application, each microservice instance may run in its own container, and several containers can share a common pool of hosts.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
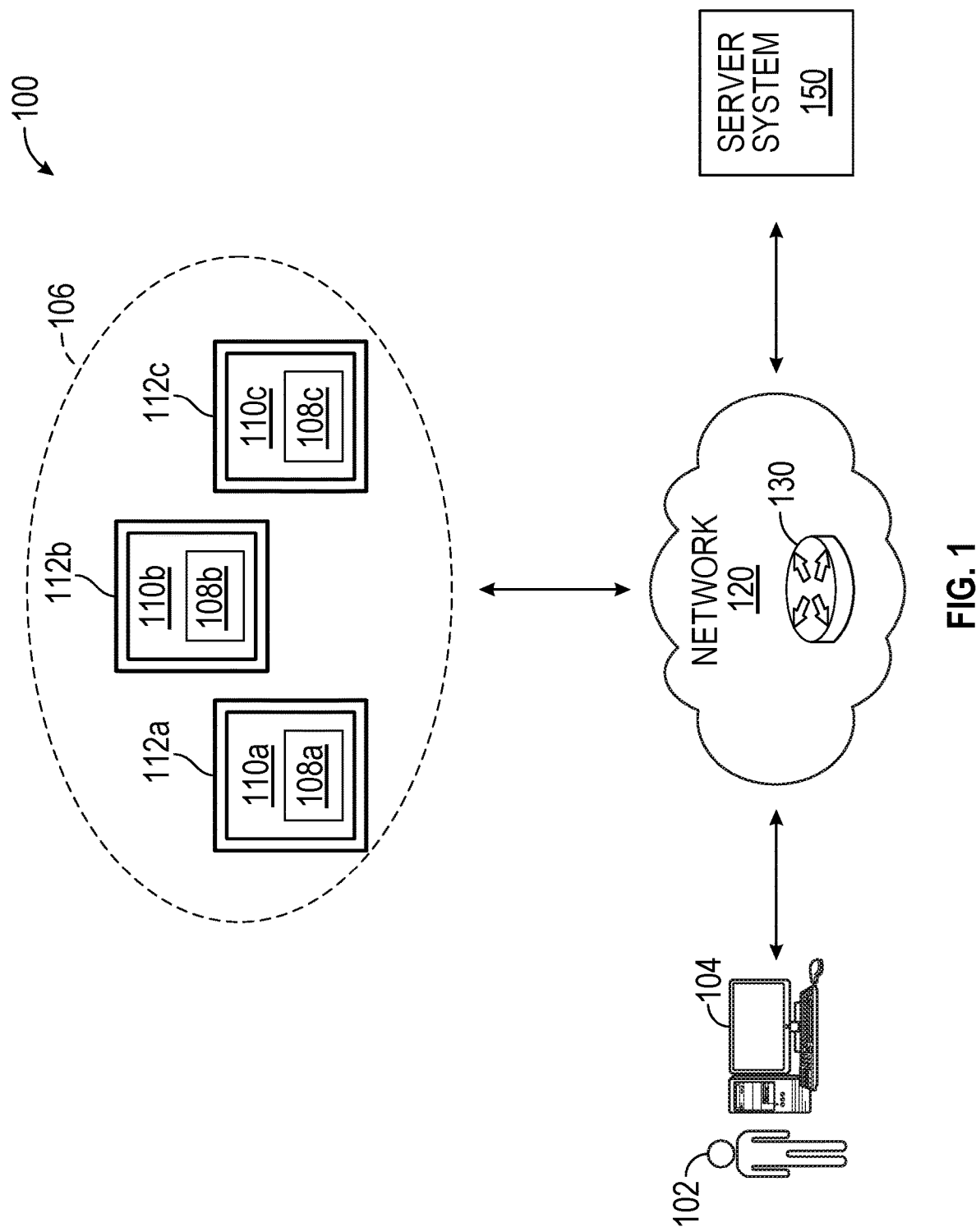
FIG. 1 is a block diagram of an example operating environment.

Differentiated sidecars in a service mesh may be provided. A first routing rule including a first plurality of weights to be associated with a first plurality of data paths of a first microservice instance may be received. Next, a first mapping between a first set of features associated with the first microservice instance and the first plurality of weights may be determined. Then a second microservice instance may be detected and a second set of features associated with the second microservice instance may be detected. A second routing rule including a second plurality of weights to be associated with a second plurality of data paths of the second microservice instance may be determined. The second plurality of weights may be determined such that a second mapping between the second set of features and the second plurality of weights imitates the first mapping.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to thedisclosed methods. Accordingly, the following detailed description does not limit the disclosure. Instead, the proper scope of the disclosure is defined by the appended claims.

Serverless computing may refer to a computing model in which charges are determined based on an actual amount of resources consumed by an application. To minimize the amount of resources consumed, users may use a microservice architecture for designing the application. Microservice architecture may involve breaking down the application into independently deployable, small, modular services, also referred to as a microservice instances or simply as microservices. Each microservice instance may be configured to perform a single function, such as routing network traffic, making an online payment, or checking inventory. Each microservice instance may be encapsulated in a container, which may provide a runtime environment for execution of the microservice instance. The container may be deployed in a host and several containers may share a common pool of hosts.

Microservice instances may communicate with each other through a service mesh. In a service mesh, requests between the microservice instances may be routed through proxies, also referred to as sidecars. Each microservice instance may be associated with a sidecar that may act as a gateway for data traffic including interactions with other microservices. A sidecar may accept a connection and spread the load across the service mesh to appropriate downstream containers that may serve the request. A controller may provide access control policies and collect performance metrics for the sidecars. The controller may receive the access control policies as routing rules, also referred to as service rules, from an administrator. For example, an administrator may define the routing rule at the time of deployment of the application that may be enforced by the controller.

Microservice instances may scale-in/scale-out, besides terminating and resurrecting, dynamically in different regions spanning multiple geographical locations. Service mesh, despite having the capability of statically defining rule based policy definitions, may not prevent degradation of communication between relocated microservice instances. For example, applying a same routing rules across all sidecars in routing/calling dependent microservice instances upstream may lead to inefficiency in data traffic routing. When a caller microservice undergoes relocation, the existing routing rules may become ineffective. Similarly, when a callee microservice instance with upstream dependency relocates, a scale-in may occur that may change the topology of the microservices, or when a new microservice instance is introduced, the existing routing rules may lead to inefficiency in routing of data traffic between microservice instances. In addition, communication degradation/fragility may be encountered for the caller microservice instance from the perspective of routing to upstream dependent microservice instances.

Embodiments of the present disclosure may provide processes for providing differentiated sidecars in a service mesh by dynamically determining routing rules for the microservice instances. The disclosed processes may leverage a learning model and may create differentiated routing rules for a sidecar associated with a microservice instance. In addition, the disclosed processes may create routing rules for new microservice instances and may dynamically modify existing routing rules upon relocation of a microservice instance. The disclosed learning model may use imitation learning or inverse reinforcement learning, also referred to as apprentice learning, to determine the routing rules.

For example, the processes may use imitation learning to infer an intent of routing rules provided by an administrator for a microservice instance and consequently then facilitate individualized service rules for other sidecars belonging to that microservice instance. The processes disclosed herein may employ a dissimilar, prioritized routing behavior, unique to each sidecars for routing to other microservice instances. These other sidecars may belong to similar instances of microservice instances spanning different portions of the cloud. Moreover, the dissimilar, prioritized routing behavior for the same microservice instance may be provided on relocation. For example, if a first instance of a first microservice is resurrected in a different portion of the cloud, accordingly its context (metadata) may change, and the resurrected microservice may then afford a change in its prioritized routing pool. In addition, introduction of new microservice instances may be entertained with recommendations for routing rules using the imitation model trained on equivalent microservice instances.

According to embodiments, the learning model may imitate an administrator by interpreting an intent or a reward associated with the routing rules specified by an administrator. Once the intent or reward is interpreted, the learning model may attempt to learn, so that the routing rule it comes up with may converge with how the administrator would have defined. The learning model may use a plurality of variables, such as, a state variable, actions variable, a reward variable, and a policy variable to determine the routing rule for example. The state variable may include a vector or a set of features associated with the microservice, such as, a host location, application/service memory footprint, bandwidth requirements, associated upstream microservices, financial costing, etc. An actions variable may include changing priority to various upstream microservices for load balancing. A reward variable may be an unknown and may include describing the intent that would attempt to be found as part of the inverse reinforcement learning. A policy variable may include routing rules arrived as part of the learning process, to be applied to the microservice instance. In example embodiments, the learning model may use a Markov Decision Process (MDP) to determine the routing rule.

FIG. 1 illustrates an example environment 100 in which various embodiments of the present disclosure may be practiced. Environment 100 may include an administrator 102 associated with a user device 104. Environment 100 may further include an application 106. Application 106 may be a serverless architecture having independently deployable, small, modular services, also referred to as a microservice instances. For example, may include a first microservice M1 108a, a second microservice M2 108b, and a third microservice M3 108c, collectively referred to as a plurality of microservice instances 108 or microservices 108. In an illustrative example, application 106 may correspond to an e-commerce application. Such an application may be decomposed into independent functional units such as taking an order, checking the order, tracking a shipment, and the like. Accordingly, each such functional unit may be executed as a microservice.

As depicted in FIG. 1, each microservice may be encapsulated in a container, which in turn may be housed in a host. For example, first microservice M1 108a may be encapsulated in a first container 110a, which may be housed in a first host 112a. Similarly, second microservice M2 108b may be encapsulated in a second container 110b, which may be housed in a second host 112b. In addition, third microservice M3 108c may be encapsulated in a third container 110c, which may be housed in a third host 112c. First container 110a, second container 110b, and third container 110c may collectively be referred to as a plurality of containers 110 or as containers 110. Similarly, first host 112a, second host 112b, and third host 112c may collectively be referred to as a plurality of hosts 112 or as hosts 112. Although application 106 is depicted to be associated with three microservices 108, application 106 may be associated with any number of microservices and is not limited to three. Moreover, several microservices may share a pool of hosts. Accordingly, a single host may include one or more microservices.

In an illustrative example, administrator 102 may use a Web browser application installed in user device 104 to access and manage application 106 or microservices of application 106 over a communication network, such as a network 120. Network 120 may include wired networks, wireless networks, and combinations thereof. Administrator 102's communication with application 106 may be facilitated through a network gateway 130. Environment 100 may further include a server 150 that may communicate with network gateway 130 and application 106 including microservices 108, with containers 110, and with hosts 112.

Figure 2:
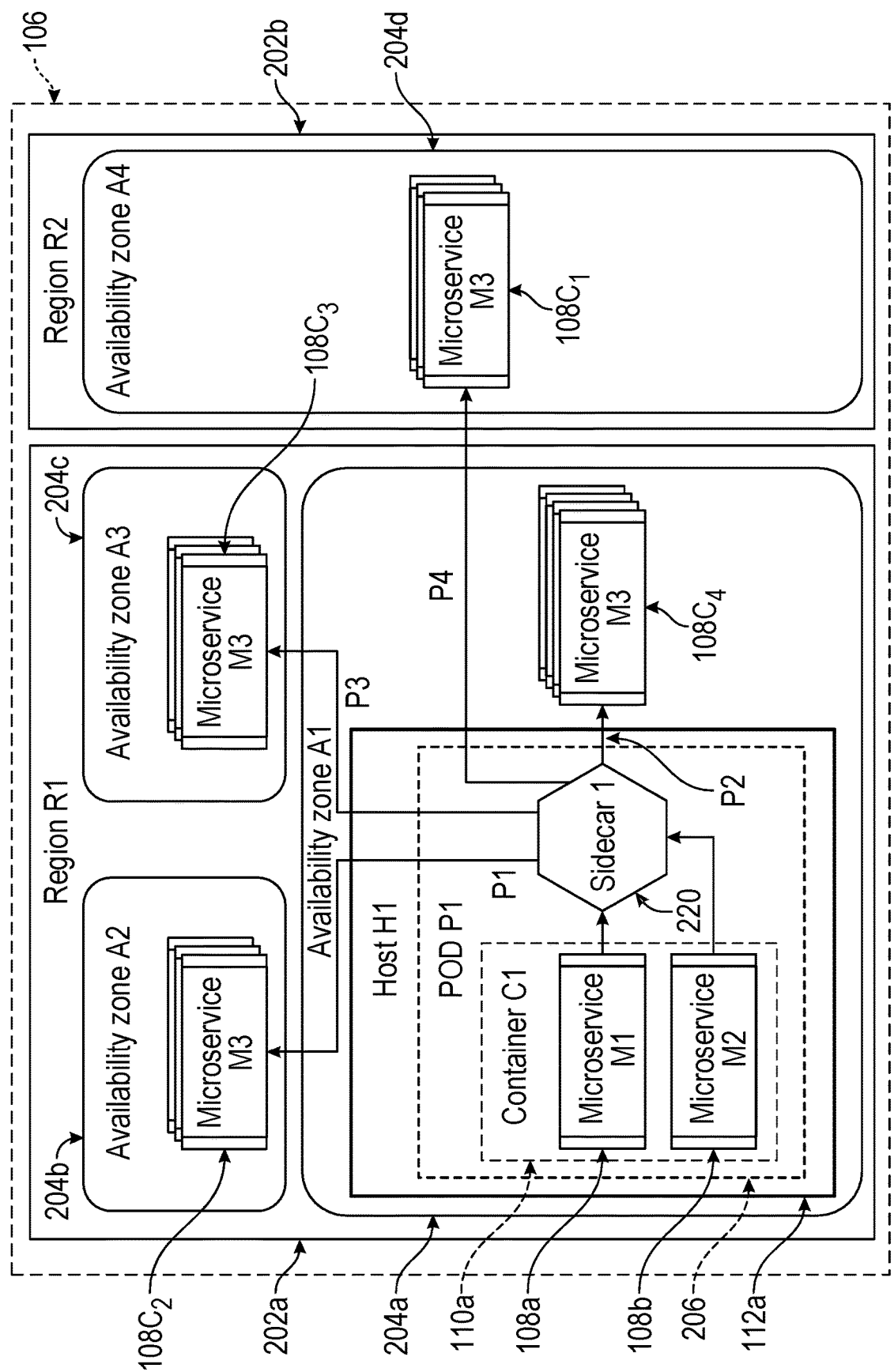
FIG. 2 is a block diagram illustrating an example service mesh associated with an example application.

FIG. 2 is a block diagram illustrating an example service mesh associated with application 106. Application 106 may be broken into a plurality of functional units, each of which may be executed by a microservice instance. For example, application 106 may be executed in first microservice M1 108a, second microservice M2 108b, and third microservice M3 108c. Each of first microservice M1 108a and second microservice M2 108b may be a single instance microservice. Third microservice M3 108c, however, may include a plurality of instances, for example, a first instance third microservice M3 108c1, a second instance third microservice M3 108c2, a third instance third microservice M3 108c3, and a fourth instance third microservice M3 108c4.

As shown in FIG. 2, microservices 108 may be spread over a plurality of regions, for example, a first region R1 202a and a second region R2 202b, collectively referred to as a plurality of regions 202 or as regions 202. First region R1 202a may include a plurality of availability zones 204, for example, a first availability zone A1 204a, a second availability zone A2 204b, and a third availability zone A3 204c. Second region R2 202b may include a fourth availability zone A4 204d. Each of the plurality of availability zones 204 may include one or more hosts 112, which may include one or more containers 110.

For example, first microservice M1 108a and second microservice M2 108b may be configured in first container C1 110a. First container C1 110a may be included in a first container orchestration unit POD P1 206 hosted on a first host H1 112a. First container orchestration unit POD P1 206 may be associated with a sidecar 210. First host H1 112a may be located in first availability zone A1 204a. First availability zone A1 204a may also include fourth instance third microservice M3 108c4. Second instance third microservice M3 108c2 may be located in second availability zone A2 204b and third instance third microservice M3 108c3 may be located in third availability zone A3 204c. First instance third microservice M3 108c1 may be located in fourth availability some A4 204d.

In example embodiments, inter communication between microservices 108 may be facilitated via one or more data paths. For example, first microservice M1 108a and second microservice M2 108b may communicate with second instance third microservice M3 108c2 via a first data path P1. Similarly, first microservice M1 108a and second microservice M2 108b may communicate with fourth instance third microservice M3 108c4 via a second data path P2, with third instance third microservice M3 108c3 via a third data path P3, and with first instance third microservice M3 108c1 via a fourth data path P4. First data path P1 and third data path P3 may span across two availability zones, and fourth data path p4 may span across two regions.

Figure 3:
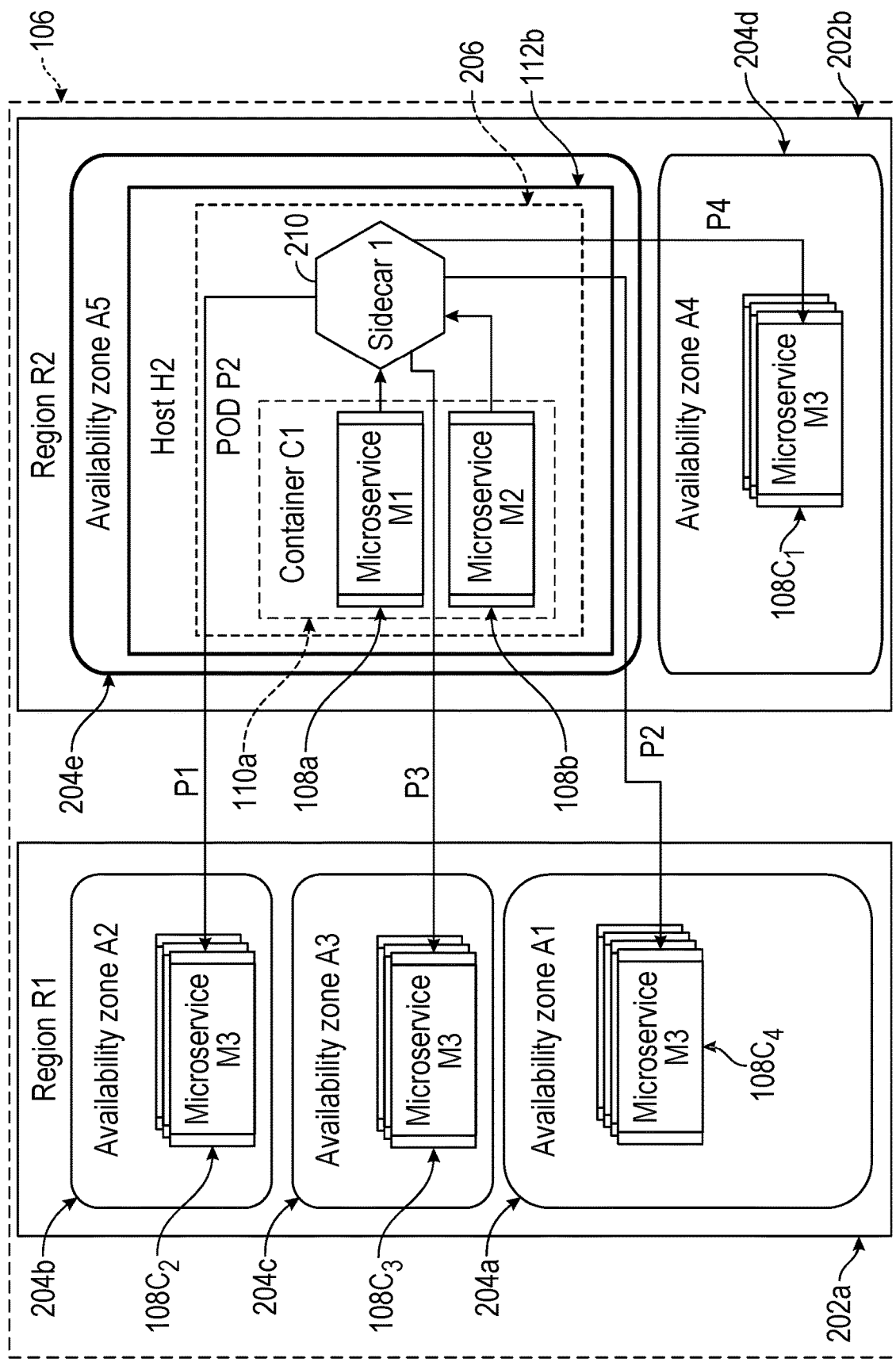
FIG. 3 is a block diagram illustrating altered a service mesh of FIG. 2.

FIG. 3 is a block diagram illustrating an example of altered a service mesh associated with application 106. FIG. 3 illustrates an example in which first container orchestration unit POD P1 206 of application 106 of FIG. 2 may be relocated from first host H1 112a of first availability zone A1 204a of first region R1 202a to a second host H2 112b of a fifth availability zone A5 204e of second region R2 202a. After the relocation, first microservice M1 108a, second microservice M2 108b, and first instance third microservice M3 108c1 may be located in second region R2 202b. In addition, with the relocation, each of first data path P1, second data path P2, and third data path P3 may span across two regions, and fourth data path P4 may span across two availability zones. The disclosure may automatically determine routing rules for the modified microservice instances.

Figure 4:
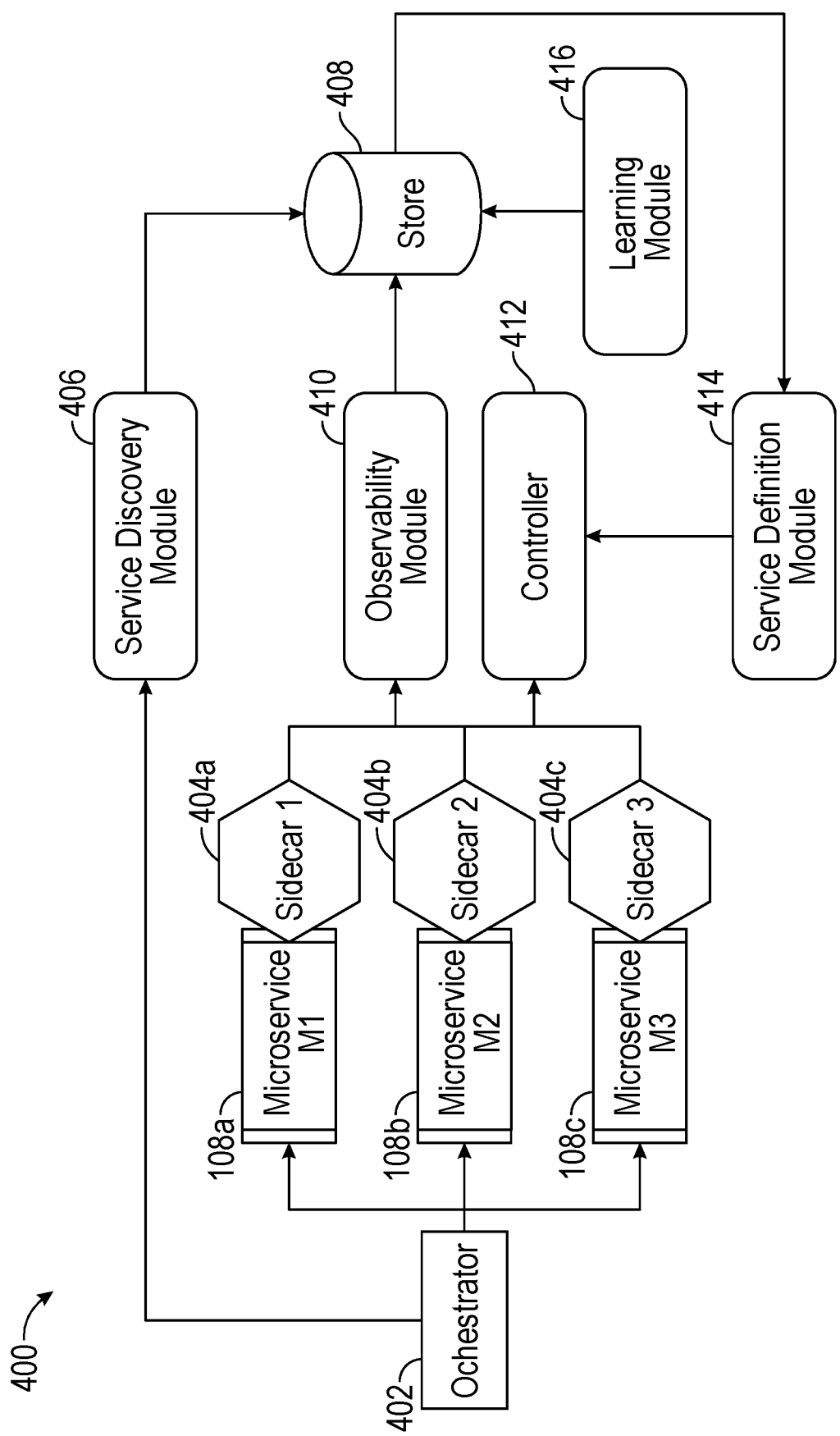
FIG. 4 is a block diagram of a system for providing differentiated sidecars in a service mesh.

FIG. 4 illustrates a block diagram of a system 400 for providing differentiated sidecars in a service mesh. System 400 may include a plurality of microservices 108, for example, first microservice 108a, second microservice 108b, and third microservice 108c. Each of the plurality of microservices 108 may be associated with a sidecar. For example, first microservice M1 108a may be associated with a first sidecar 1 404a, second microservice M2 108b may be associated with a second sidecar 2 404b, and third microservice M3 108c may be associated with a third sidecar 3 404c. First sidecar 1 404a, second sidecar 2 404b, and third sidecar 3 404c may collectively be referred to as a plurality of sidecars 404 or as sidecars 404. Each of the plurality of microservices 108 may be operative to send and receive data, including requests, via an associated respective sidecar 404.

System 400 may further include an orchestrator 402, a service discovery module 406, a store 408, an observability module 410, a controller 412, a service definition module 414, and a reinforced learning module 416. Orchestrator 402 may be operable to initiate or install one or more of microservices 108 and associated sidecars 404. Orchestrator may have visibility across application policies, application component runtime performance and infrastructure performance metrics including processing resources, storage resources, and network resources. Orchestrator 402 may be operative to deploy containers on the most appropriate host and connect them together. Orchestrator 402 may further be operative to scale containers if data to process/compute a microservice instance exceeds a predetermined limit. Moreover, orchestrator 402 may also handle failures of a microservice instance by doing automatic fail-overs.

Sidecars 404 may be operative to receive routing rules for the data paths, and route the data traffic according to the received routing rules. Routing rules may be received from controller 412 that may be operative to contain routing rules. At the initiation of microservices 108, a generalized routing rule may be associated with each instance of a microservice, and handcrafted by an administrator based on deployment topology and various upstream dependent microservice instances. The generalized routing rule may be used by each of microservices 108 for inter communication. Controller 412 may further be operative to receive updated routing rules.

Service discovery module 406 may be operative to discover and register changes in instances of microservices 108. For example, service discovery module 406 may be operative to discover scale-in/scale-out, or activation of a new instance of any of microservices 108. Service discovery module 406 may register identifying information such as host, port, node name, and the like, for microservices 108 to facilitate their discovery and use such information to identify other microservices. The information discovered by service discovery module may be stored in store 408.

Observability module 410 may be operative to determine information about states, including metadata associated with microservices 108, and metrics for the data traffic passing through sidecars 404. For example, observability module 410 may be operative to determine an internet protocol (IP) address, hostname, region, container requirements, underlying hardware, link bandwidth, etc. for each of microservices 108 and associated sidecars 404. Observability module 410 may be operative to determine network traffic metrics for the data paths.

Service definition module 414 may be operative to allow storing of the routing rules to be enforced by sidecars 404. For example, service definition module may query for updated/individualized routing rules from store 408 and provide the received routing rules to controller 412. Updated/individualized routing rules may be stored in store 408 by reinforced learning module 416. For example, reinforced learning module 416 may be operative to dynamically update the routing rules to be to be enforced by sidecars 404 and provide the updated routing rules to store 408. A method for updating/individualizing the routing rules is discussed with reference to FIG. 5 of the disclosure.

Figure 5:
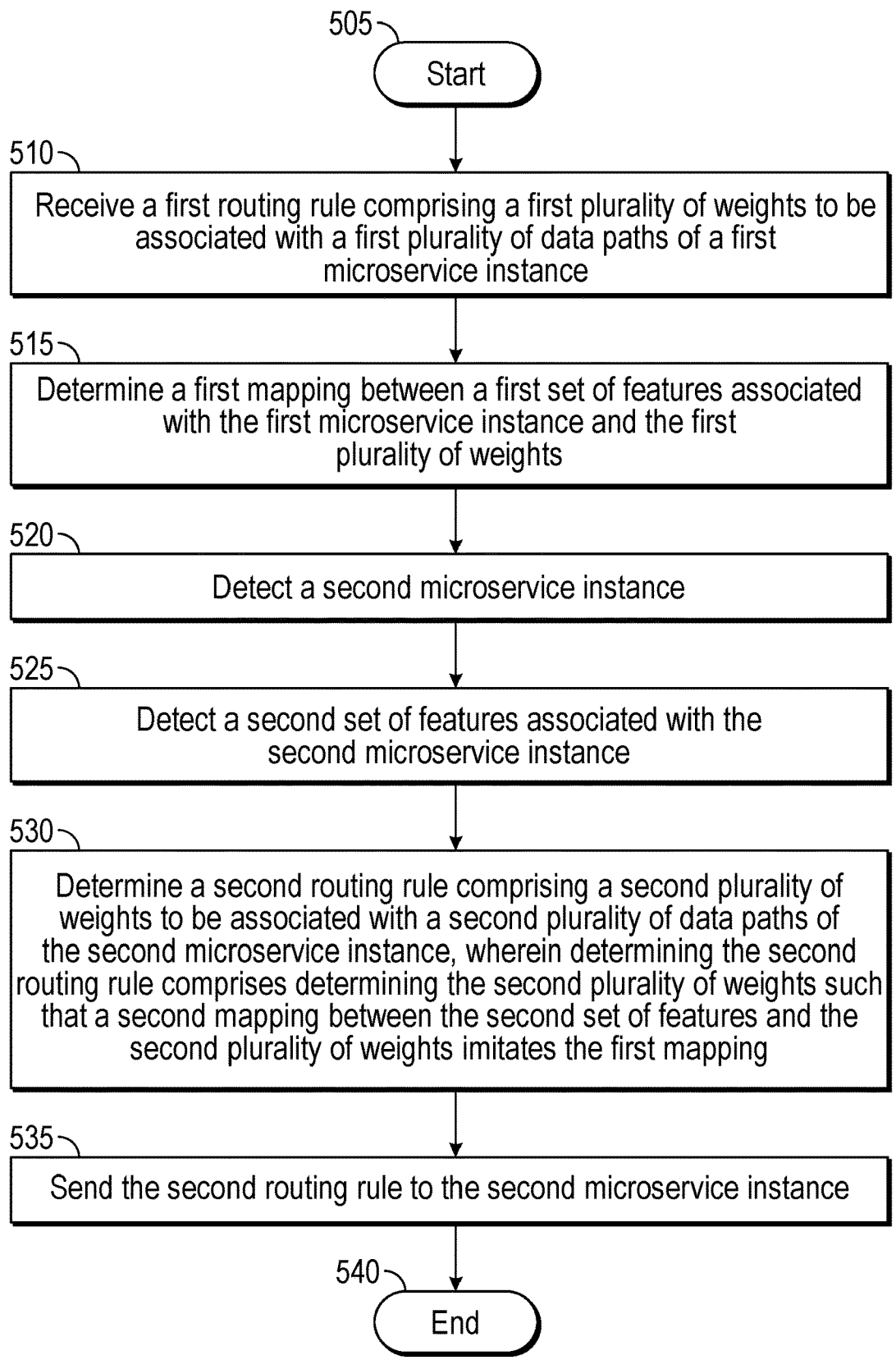
FIG. 5 is a flow chart of a method for providing differentiated sidecars in a service mesh.
Figure 6:
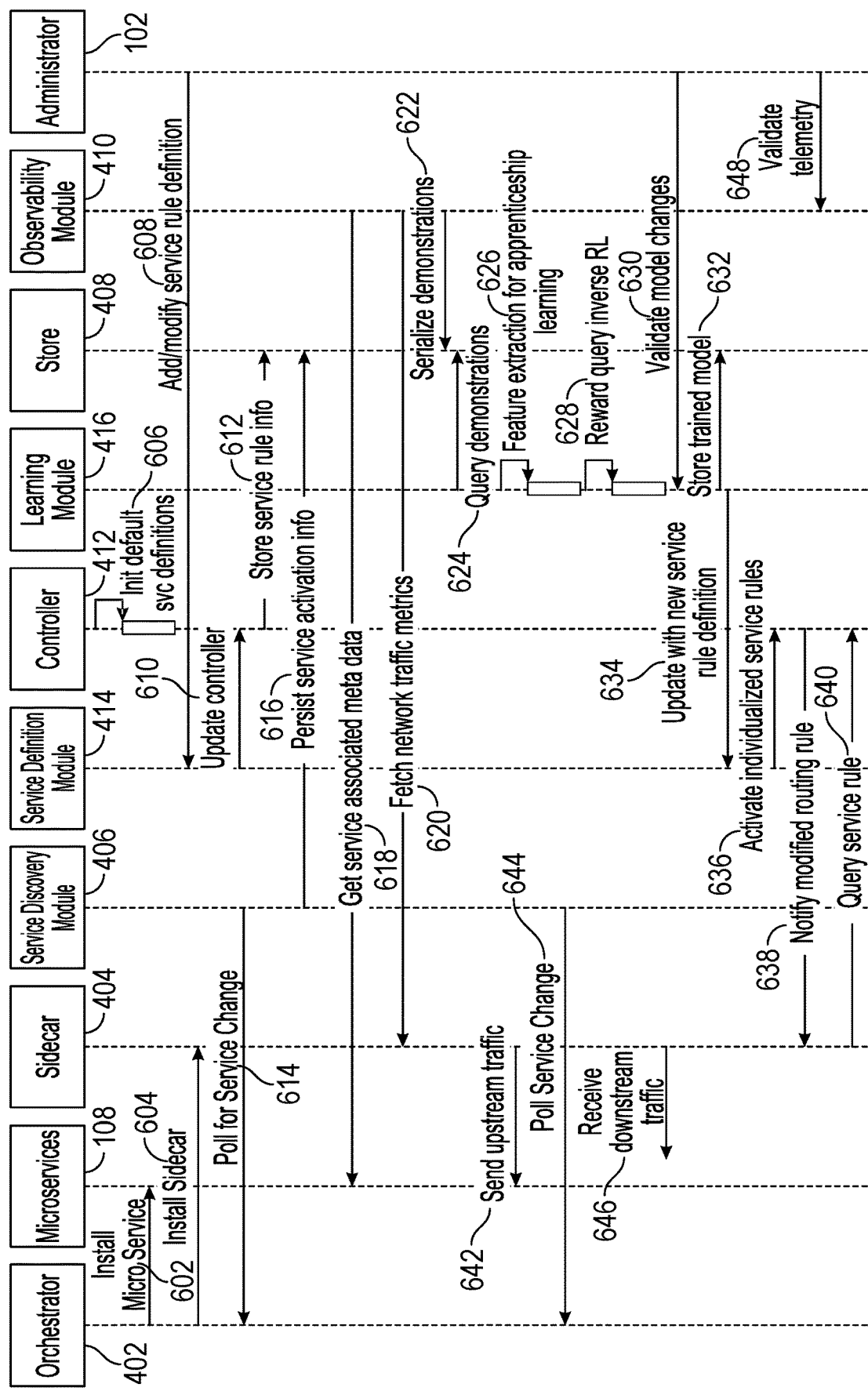
FIG. 6 is a process diagram for a method for providing differentiated sidecars in a service mesh.

FIG. 5 is a flow chart setting forth the general stages involved in a method 500 consistent with an embodiment of the disclosure for differentiated sidecars in a service mesh. Method 500 may be employed to determine routing rules for inter communication between the microservice instances 108 of application 106. Method 500 may be implemented using server 150, microservices 108, sidecars 404, and system 400 as described about with respect to FIGS. 1-4. A computing device 700 as described in more detail below with respect to FIG. 7 may comprise a working environment for server 150, microservices 108, containers 110, hosts 112, sidecars 404, and system 400. Method 500 will be described in conjunction with a process diagram 600 of a process for differentiated sidecars in a service mesh. Ways to implement the stages of method 500 will be described in greater detail below.

Prior to the beginning of method 500, during an initiation of service mesh 200, orchestrator 402 may install one or more instances of microservices 108 (stage 602). In addition, orchestrator 402 may install one or more sidecars 404 alongside microservices 108 (stage 604). After installation of microservices 108 and sidecars 404, controller 412 may initiate default service rules for microservices 108 and sidecars 404 (stage 606). In addition, after installation of microservices 108 and sidecars 404, administrator may add or modify the default service rules (stage 608). The added or modified service rules may be provided to service definition module 414. After receiving the service rules, service definition module 414 may update controller 412 (stage 610). After being updated by service definition module 414, controller 412 may store the service rule information in store 408 (stage 612). In addition, service discovery module 406 may poll orchestrator 402 for service change (stage 614) and may persist service activation information to store 408 (stage 616).

Method 500 may begin at block 505 and proceed to block 510 where a first routing rule may be received. The first routing rule may include a first plurality of weights to be associated with a first plurality of data paths associated with a first microservice instance. For example, the first routing rule may include weights to be assigned to first data path P1, second data path P2, third data path P3, and fourth data path P4 of microservice instances of FIG. 2. In example embodiments, the first routing rule may be provided by administrator 102 at the time of initial deployment (stage 608).

After receiving the first routing rule at block 510, method 500 may proceed to block 515 where a first mapping between a first set of features associated with the first microservice instance and the first plurality of weights may be determined. The first mapping may represent an intent or reward of the first routing rule, which may be determined by interpreting the routing rules in light of the first set of features associated with the first microservice. The features may include a location of one or more hosts 112, a memory footprint, bandwidth requirements, associated upstream microservices 108, financial costing, a region, underlying hardware, link latency, container requirements, etc.

The intent or reward may be determined using a learning model. For example, observability module 410 may get associated metadata from microservices 108 (stage 618). Moreover, observability module 410 may fetch network traffic metrics from sidecars 404 (stage 620). After fetching the associated metadata and network traffic metrics, observability module 410 may serialize demonstrations in store 408 (stage 622). Learning module 416 may query the demonstrations from store 408 (stage 624). After querying the demonstrations, learning module 416 may extract features for learning (stage 626). Learning module 416, for example, may use inverse reinforcement learning process (stage 628) to determine the reward or intent.

Once having determined the first mapping at block 515, method 500 may proceed to block 520 where a second microservice instance may be detected. The second microservice instance may include relocation of the first microservice from a first container/host/region to another container/host/region. Moreover, the second microservice instance may be detected when a new microservice instance is initiated. For example, the second instance may be detected when first container orchestration unit POD P1 206a of application 106 of FIG. 2 may be relocated from first host H1 112a of first availability zone A1 204a of first region R1 202a to a second host H2 112b of a fifth availability zone A5 204e of second region R2 202a. The second microservice instance may be detected by service discovery module 406 (stage 614). For example, service discovery module 406 is operative to continuously poll orchestrator 402 for service change (stage 644).

After detecting the second microservice instance at block 520, method 500 may proceed to block 525 where a second set of features associated with the second microservice instance may be detected. The second set of features may include a location one or more of a hosts, a memory footprint, bandwidth requirements, associated upstream microservices, financial costing, a region, underlying hardware, link latency, container requirements, etc. The second set of features at be detected by observability module (stages 616, 618).

Once having detected the second set of features at block 525, method 500 may proceed to block 530 where a second routing rule may be determined. The second routing rule may include a second plurality of weights to be associated with a second plurality of data paths of the second microservice instance. The second routing rule may be determined by determining the second plurality of weights such that a second mapping between the second set of features and the second plurality of weights imitates the first mapping. That is, the second routing rule may be determined to imitate the intent or reward of the first routing rule. For example, weights to be assigned to first data path P1, second data path P2, third data path P3, and fourth data path P4 of microservice instances of FIG. 3 may be determined by imitating the reward associated with the weights assigned by the administrator based on the first set of features.

According to embodiments, the second routing rule may be determined by a learning model that may be based on inverse reinforcement learning. The inverse reinforcement learning may use training samples to learn a reward being optimized by administrator 102 and use it to improve the learning model. The learning model may then interpret and imitate the reward of the administrator from administrator defined first routing rule and determine the second routing rule as the administrator would for a new instance or modified instance. The learning model may use Markov Decision Process (MDP) to imitate administrator 102. For example, the learning model may be represented as MDP/R(S,A,T) where R may represent a reward, S may represent set of features, A may represent actions, such as, changing load balancing priority weights, and T may represent temporal information captured. For example, the second routing rule may be determined by learning module 416 by training the learning model using the inverse reinforcement learning. The trained learning model may be validate by administrator 102 (stage 630). In addition, administrator 102 may also validate telemetry (stage 648). Learning module 416 may receive the validated learning model from administrator 102 and may store the validated learning model in store 408 (stage 632). Moreover, the validated learning model may be used to determine the second routing rule.

After determining the second routing rule at block 530, method 500 may proceed to block 535 where the second routing rule may be sent to the second microservice instance. Alternatively, the second routing rule may be sent to a sidecar, associated with the second microservice instance, that is, sidecar 210 of FIG. 3 or sidecar 404 of FIG. 4. The sidecar may use the second routing rule to manage the data paths associated with the second microservice instance. For example, learning module 416 may update service definition module 414 with the new service rule definition, that is, the second routing rule (stage 634). Service definition module 414, after receiving the new service rule definition, may activate individualized service rules with controller 412 (stage 636). Controller 412 in turn may notify the modified routing rule to sidecar 404 (stage 638). For example, sidecar 404 may be operative to periodically query controller 412 for service rules (stage 640). Sidecar 404, after receiving the modified routing rule, may send upstream traffic in accordance with the received modified routing rule (stage 642). In addition, sidecar 404 may receive upstream traffic in accordance with the received modified routing rule (stage 646). Once having determine the second routing rule at block 530, method 500 may cease at END block 540.

Figure 7:
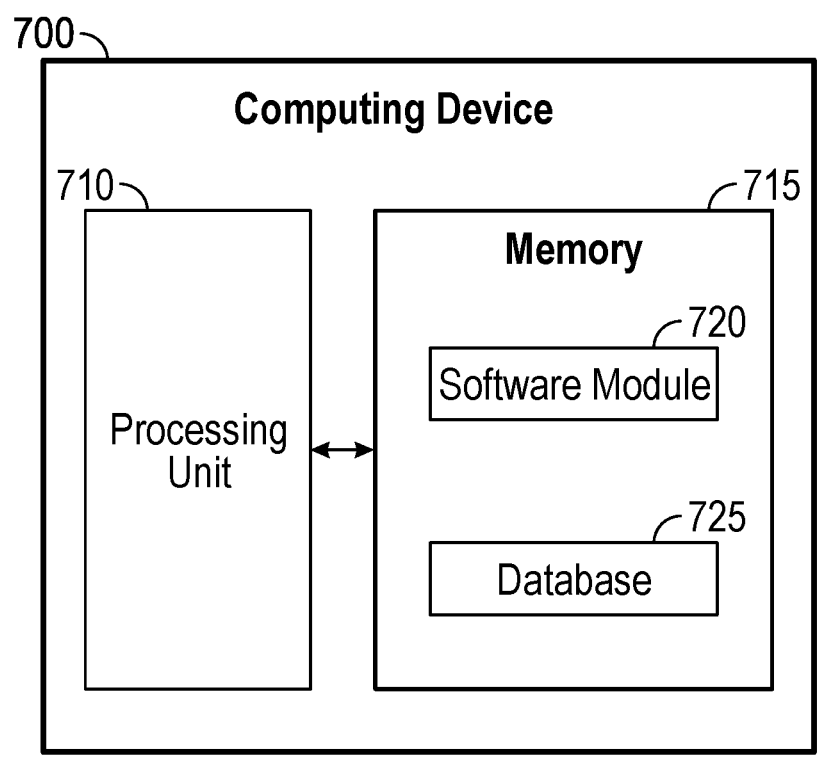
FIG. 7 is a block diagram of a computing device.

FIG. 7 shows computing device 700. As shown in FIG. 7, computing device 700 may include a processing unit 710 and a memory unit 715. Memory unit 715 may include a software module 720 and a database 725. While executing on processing unit 710, software module 720 may perform processes for providing differentiated sidecar in a service mesh, including for example, any one or more of the stages from method 500 described above with respect to FIG. 5. Computing device 700, for example, may provide an operating environment for elements of operating environment 100 including, but not limited to, client device 104, microservices 108, containers 110, hosts 112, and server system 150. Client device 104, microservices 108, containers 110, hosts 112, sidecars 404, and server system 150 operate in other environments and are not limited to computing device 700.

Computing device 700 may be implemented using a personal computer, a network computer, a mainframe, a router, or other similar microcomputer-based device. Computing device 700 may comprise any computer operating environment, such as hand-held devices, multiprocessor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples and computing device 700 may comprise other systems or devices.

According to embodiments, a method may include receiving a first routing rule comprising a first plurality of weights to be associated with a first plurality of data paths of a first microservice instance and determining a first mapping between a first set of features associated with the first microservice instance and the first plurality of weights. The method may further include detecting a second microservice instance; detecting a second set of features associated with the second microservice instance; and determining a second routing rule which may include a second plurality of weights to be associated with a second plurality of data paths of the second microservice instance. The second plurality of weights may be determined such that a second mapping between the second set of features and the second plurality of weights imitates the first mapping.

In example embodiments, receiving the first routing rule may include receiving the first plurality of weights to be associated with the first plurality of data paths between the first microservice instance and a plurality of upstream microservice instances. In addition, receiving the first routing rule having the first plurality of weights may include receiving the first routing rule where the first routing rule is provided by an administrator of the first microservice instance. Detecting the second microservice instance may include detecting a new microservice instance. Moreover, detecting the second microservice instance may include detecting relocation of the first microservice instance from a first host to a second host. In addition, detecting the second set of features associated with the second microservice instance may include detecting one or more of a host location, a region of a host, container requirements, a link bandwidth, and hardware resources.

In example embodiments, determining the second plurality of weights such that the second mapping imitates the first mapping may include reinforcing imitation of the first mapping. Moreover, determining the second plurality of weights such that the second mapping imitates the first mapping may include determining the second plurality of weights based on machine learning. In addition, determining the second plurality of weights such that the second mapping imitates the first mapping may further include determining the second plurality of weights based on inverse reinforcement learning.

According to embodiments, an apparatus may include a memory storage and a processing unit coupled to the memory storage. The processing unit may be operative to receive a first routing rule comprising a first plurality of weights to be associated with a first plurality of data paths associated with a first microservice instance; determine a first mapping between a first set of features associated with the first microservice instance and the first plurality of weights; and interpret the first routing rule to determine an intent of the first routing rule. The processing unit may further be operable to detect a second microservice instance; detect a second set of features associated with the second microservice instance; and determine a second routing rule comprising a second plurality of weights to be associated with a second plurality of data paths associated with the second microservice instance, the second routing rule imitating the intent of the first routing rule.

Embodiments of the disclosure may provide a non-transitory computer-readable medium that stores a set of instructions which when executed perform a method executed by the set of instructions. The method may include receiving a first routing rule comprising a first plurality of weights to be associated with a first plurality of data paths between a first microservice and at least one upstream microservice; and determining a first mapping between a first set of features associated with the first microservice and the first plurality of weights. The method may further include detecting a change in at least one of the following: the first microservice and the at least one upstream microservice; detecting a second set of features associated with changed microservice; and determining a second routing rule comprising a second plurality of weights to be associated with the first plurality of data paths between the changed microservice and the at least one upstream microservice, wherein determining the second routing rule comprises determining the second plurality of weights such that a second mapping between the second set of features and the second plurality of weights imitates the first mapping.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a first routing rule comprising a first plurality of weights to be associated with a first plurality of data paths of a first microservice instance;
   determining a first mapping between a first set of features associated with the first microservice instance and the first plurality of weights associated with the plurality of data paths of the first microservice instance;
   detecting a second microservice instance;
   detecting a second set of features associated with the second microservice instance; and
   determining a second routing rule comprising a second plurality of weights to be associated with a second plurality of data paths of the second microservice instance, wherein determining the second routing rule comprises:
   determining a reward associated with the first mapping between the first set of features associated with the first microservice instance and the first plurality of weights of the first routing rule, the reward defining an association between the first set of features, actions comprising adjusting the plurality of weights, and temporal performance data associated with the adjusting the plurality of weights, and
   determining the second plurality of weights such that a second mapping between the second set of features and the second plurality of weights converges with the reward associated with the first mapping and provides a dissimilar routing behavior from the first microservice instance, wherein the second plurality of weights are determined based on machine learning.

2. The method of claim 1, wherein receiving the first routing rule comprising the first plurality of weights comprises receiving the first routing rule comprising the first plurality of weights to be associated with the first plurality of data paths between the first microservice instance and a plurality of upstream microservice instances.

3. The method of claim 1, wherein receiving the first routing rule comprising the first plurality of weights comprises receiving the first routing rule wherein the first routing rule is provided by an administrator of the first microservice instance.

4. The method of claim 1, wherein detecting the second microservice instance comprises detecting a new microservice instance.

5. The method of claim 1, wherein detecting the second microservice instance comprises detecting a relocation of the first microservice instance from a first host to a second host.

6. The method of claim 1, wherein detecting the second set of features associated with the second microservice instance comprises detecting at least one of the following: a host location, a region of a host, container requirements, a link bandwidth, and hardware resources.

7. The method of claim 1, wherein determining the second plurality of weights such that the second mapping imitates the first mapping further comprises reinforcing an imitation of the first mapping.

8. The method of claim 1, wherein the machine learning comprises inverse reinforcement learning.

9. An apparatus comprising:
 a memory storage; and
 a processing unit coupled to the memory storage, wherein the processing unit is operative to:
  receive a first routing rule comprising a first plurality of weights to be associated with a first plurality of data paths associated with a first microservice instance;
  determine a first mapping between a first set of features associated with the first microservice instance and the first plurality of weights associated with the plurality of data paths of the first microservice instance;
  interpret the first routing rule to determine a reward associated with the first mapping between the first set of features associated with the first microservice instance and the first plurality of weights of the first routing rule, the reward defining an association between the first set of features, actions comprising adjusting the plurality of weights, and temporal performance data associated with the adjusting the plurality of weights;
  detect a second microservice instance;
  detect a second set of features associated with the second microservice instance; and
  determine a second routing rule comprising a second plurality of weights to be associated with a second plurality of data paths associated with the second microservice instance, wherein the second routing rule converges with the reward of the first routing rule and provides a dissimilar routing behavior from the first microservice instance, and wherein the second plurality of weights are determined based on machine learning.

10. The apparatus of claim 9, wherein the processing unit being operative to determine the second routing rule comprises the processing unit being operative to change the first plurality of weights.

11. The apparatus of claim 9, wherein the processing unit being operative to detect the second microservice instance comprises the processing unit being operative to detect movement of the first microservice instance from a first location to a second location.

12. The apparatus of claim 11, wherein the processing unit being operative to detect movement of the first microservice instance comprises the processing unit being operative to detect movement of the first microservice instance from a first host to a second host.

13. The apparatus of claim 9, wherein the first microservice instance is a part of a serverless application.

14. The apparatus of claim 9, wherein the first plurality of data paths connect the first microservice instance to at least one upstream microservice instance.

15. A non-transitory computer-readable medium that stores a set of instructions which when executed perform a method executed by the set of instructions comprising:
 receiving a first routing rule comprising a first plurality of weights to be associated with a first plurality of data paths between a first microservice and at least one upstream m icroservice;
 determining a first mapping between a first set of features associated with the first microservice and the first plurality of weights associated with the plurality of data paths of the first microservice instance;
 detecting a change in at least one of the following: the first microservice and the at least one upstream microservice;
 detecting a second set of features associated with a changed microservice; and
 determining a second routing rule comprising a second plurality of weights to be associated with the first plurality of data paths between the changed microservice and the at least one upstream microservice, wherein determining the second routing rule comprises:
  determining a reward associated with the first mapping between the first set of features associated with the first microservice instance and the first plurality of weights of the first routing rule, the reward defining an association between the first set of features, actions comprising adjusting the plurality of weights, and temporal performance data associated with the adjusting the plurality of weights, and
  determining the second plurality of weights such that a second mapping between the second set of features and the second plurality of weights converges with the reward associated with the first mapping and provides a dissimilar routing behavior from the first microservice instance, wherein the second plurality of weights are determined based on machine learning.

16. The non-transitory computer readable medium of claim 15, wherein the first routing rule is sent to a first sidecar associated with the first microservice, and wherein the second routing rule is sent to a second sidecar associated with the at least one upstream microservice.

17. The non-transitory computer readable medium of claim 15, wherein the machine learning comprises a Markov Decision Process.

18. The non-transitory computer readable medium of claim 15, wherein the machine learning comprises inverse reinforcement learning.

19. The method of claim 1, wherein the machine learning comprises inverse reinforcement learning to learn the reward.

20. The method of claim 1, wherein the machine learning comprises a training model validated by an administrator.

* * * * *